(12) United States Patent
Jow et al.

(10) Patent No.: US 6,924,061 B1
(45) Date of Patent: Aug. 2, 2005

(54) NONFLAMMABLE NON-AQUEOUS ELECTROLYTE AND NON-AQUEOUS ELECTROLYTE CELLS COMPRISING THE SAME

(75) Inventors: T. Richard Jow, Potomac, MD (US); Kang Xu, Gaithersburg, MD (US); Shengshui Zhang, Olney, MD (US); Michael S. Ding, Gaithersburg, MD (US)

(73) Assignee: The United States of America as represented by the Secretary of Army, Washington, DC (US)

( * ) Notice: Subject to any disclaimer, the term of this patent is extended or adjusted under 35 U.S.C. 154(b) by 313 days.

(21) Appl. No.: 10/060,165

(22) Filed: Feb. 1, 2002

Related U.S. Application Data

(60) Provisional application No. 60/268,516, filed on Feb. 13, 2001, provisional application No. 60/267,895, filed on Feb. 13, 2001, and provisional application No. 60/269,478, filed on Feb. 20, 2001.

(51) Int. Cl.$^7$ ................................................ H01M 6/14

(52) U.S. Cl. ........................ 429/199; 429/324; 252/62.2

(58) Field of Search ................................. 429/324, 199, 429/203, 218, 194, 197; 262/62.2, 500

(56) References Cited

U.S. PATENT DOCUMENTS

| | | | |
|---|---|---|---|
| 5,474,862 A | 12/1995 | Okuno et al. | 429/197 |
| 5,580,684 A * | 12/1996 | Yokoyama et al. | 429/324 |
| 5,830,600 A | 11/1998 | Narang et al. | 429/192 |
| 5,916,708 A | 6/1999 | Besenhard et al. | 429/199 |
| 6,010,806 A | 1/2000 | Yokoyama et al. | 429/330 |
| 6,068,950 A | 5/2000 | Gan et al. | 429/231.9 |
| 6,379,846 B1 * | 4/2002 | Terahara et al. | 429/344 |

OTHER PUBLICATIONS

"Development of High conductivity Lithium–ion Electrolytes for Low Temperature Cell Applications," M.C. Smart, V.V. Ratnakumar, S. Surampudi Proccedings of the 38$^{th}$ Power Sources Conference, Cherry Hill, NJ, Jun. 8–11, 1998.

"Effect of Carbon Coating on Electrochemical Performance of Treated Natural Graphiite as Lithium–Ion Battery Anode Material," Masaki Yoshio, Hongyu Wang, Kenji Fukuda, Yoichiro Hara and Yoshio Adachi Journal of The Electrochemical Society; 147 (4) 1245–1250 (2000).

"Low Temperature Electrolyte for Lithium and Lithium–Ion Batteries," Edward J. Plichta, Wishvender K. Behl,.

"Relationships between Electrolyte and Graphite Electrode in Lithium Ion Batteries," Hizuru Koshina, Hajime Nishino, Kaoru Inoue, Akiyoshi Morita, Akira Ohta.

(Continued)

*Primary Examiner*—Michael Barr
*Assistant Examiner*—Monique Wills
(74) *Attorney, Agent, or Firm*—William V. Adams

(57) ABSTRACT

A non-aqueous electrolyte to be used in a Li-ion battery includes a lithium salt, a cyclic carbonate, a linear carbonate and an alkyl fluorinated phosphate, of the following general formula

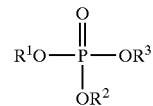

wherein $R^1$, $R^2$ and $R^3$, independently, are selected from the group consisting of straight and branched alkyl groups having 1–5 carbon atoms, and at least one of said alkyl groups is fluorinated, with the locations of said fluorination being at least β-positioned away from the phosphorous of said phosphate, such that said alkyl phosphate has a F/H ratio of at least 0.25, and said electrolyte solution is nonflammable.

24 Claims, 7 Drawing Sheets

OTHER PUBLICATIONS

"Liquid–Solid Phase Diagrams of Binary Carbonates for Lithium Batteries," Journal of The Electrochemical Society, 147 (5) 1688–1694 (2000).

U.S. Appl. No. 60/333,142, filed Nov. 27, 2001, Richard T. Jow, Solvent Systems Comprising a Mixture of Lactams and Esters for Non–Aqueous Electrolytes and Non–Aqueous Electrolyte Cells Comprising the Same.

U.S. Appl. No. 60/269478, filed Feb. 20, 2001, Richard T. Jow, Non–Aqueous Electrolyte and Solutions Comprising Additives and Non–Aqueous Electrolyte Cells Comprising the Same.

U.S. Appl. No. 60/268516, filed Feb. 13, 2001, Richard T. Jow, Fluorinated Alkyl Phosphate as Co–Solvent for Non-Aqueous Electrolyte and Non–Aqueous Electrolyte Cells Comprising the Same.

U.S. Appl. No. 60/267895, filed Feb. 13, 2001, Richard T. Jow, Non–Aqueous Electrolyte and Solutions and Non-Aqueous Electrolyte Cells Comprising the Same.

U.S. Appl. No. 60/140,673, filed Jun. 16, 1999, Richard T. Jow, New Electrolytes for High Energy Lithium–Ion Batteries.

U.S. Appl. No. 10/927,181, filed Aug. 27, 2004, Richard T. Jow, Microporous Gel Electrolyte Battery and Its Process of Manufacturing.

U.S. Appl. No. 10/855,646, filed May. 28, 2004, Richard T. Jow, Electrochemically Stable Onium Salts and Electrolytes Containing Such for Electrochemical Capacitors.

U.S. Appl. No. 10/625,686, filed Jul. 24, 2003, Richard T. Jow, Additive For Enhancing the Performance of Electrochemical Cells.

U.S. Appl. No. 10/307,537, filed Nov. 27, 2002, Richard T. Jow, Solvent Systems Comprising a Mixture of Lactams and Esters or Non–Aqueous Electrolytes and Non–Aqueous Electrolyte Cells Comprising the Same.

U.S. Appl. No. 10/060,186, filed Feb. 1, 2002, Richard T. Jow, Non–Aqueous Electrolyute Solutions Comprising Additives and Non–Aqueous Electrolye Cells Comprising the Same.

U.S. Appl. No. 10/060,165, filed Feb. 1, 2002, Richard T. Jow, Nonflammable Non–Aqueous Electrolyte and Non–Aqueous Electrolyte Cells Comprising the Same.

U.S. Appl. No. 10/060,139, filed Feb. 1, 2002, Richard T. Jow, Non–Aqueous Electrolyte Solutions and Non–Aqueous Electrolyte Cells Comprising the Same.

U.S. Appl. No. 09/757,394, filed Jan. 5, 2001, Richard T. Jow, Proton Inserted Ruthenium Oxide Electrode Material For Electrochemical Capacitors.

U.S. Appl. No. 09/398,945, filed Jul. 26, 1999, Richard T. Jow, Non–Aqueous Electrolyte Systems and Electrochemical Capacitors.

U.S. Appl. No. 09/309,393, filed May. 10, 1999, Richard T. Jow, Electrochemically Stable Onium Salts and Electrolytes Containing Such for Electrochemical Capacitors.

U.S. Appl. No. 09/193,485, filed Nov. 17, 1998, Richard T. Jow, Proton Inserted Ruthenium Oxide Electrode Material for Electro–Chemical Capacitors.

U.S. Appl. No. 09/168,338, filed Oct. 5, 1998, Richard T. Jow, Nonaqueous Electrolytes and Batteries Containing Such Electrolytes.

U.S. Appl. No. 09/158,092, filed Sep. 22, 1998, Richard T. Jow, Electrode Materials from Hydrous Metal and/or Hydrous Mixed Metal Oxides and Method of Preparing the Same.

U.S. Appl. No. 09/090,636, filed Jun. 4, 1998, Richard T. Jow, Composite Eletrode Materials for High Energy and High Power Density Energy Storage Devices.

U.S. Appl. No. 08/798,398, filed Feb. 7, 1997, Richard T. Jow, Proton Inserted Ruthenium Oxide Electrode Material For Electrochemical Capacitors.

U.S. Appl. No. 08/797,798, filed Feb. 7, 1997, Richard T. Jow, Pulsed Laser Deposition of Amorphous Metal Oxides.

U.S. Appl. No. 08/718,883, filed Sep. 24, 1996, R. T. Jow, Method of Making Composite Electrode Materials for High Energy and High Power Density Energy Storage Decvices.

U.S. Appl. No. 08/678,222, filed Jul. 11, 1996, Richard T. Jow, Electrode Materials From Hydrous Metal and/or Hydrous Mixed Metal Oxides and Method of Preparing the Same.

U.S. Appl. No. 08/670,251, filed Jun. 20, 1996, Richard T. Jow, Amorphous Thin Film Electrode Materials From Hydrous Metal Oxides.

U.S. Appl. No. 08/495,289, filed Jun. 27, 1995, Richard T. Jow, Capacitor Having an Enhanced Dielectric Breakdown Strength.

U.S. Appl. No. 08/353,418, filed Dec. 9, 1994, Richard T. Jow, Amorphous Thin Film Electrode Materials from Hydrous Metal Oxides.

U.S. Appl. No. 08/353,403, filed Dec. 9, 1994, Richard T. Jow, Composite Electrode Materials for High Energy and High Power Density Energy Storage Devices.

U.S. Appl. No. 08/278,488, filed Jul. 21, 1994, Richard T. Jow, Capacitor Having an Enhanced Dielectric Breakdown Strength.

U.S. Appl. No. 08/232,901, filed Apr. 21, 1994, Richard T. Jow, Electrode Materials from Hydrous Metal and/or Hydrous Mixed Metal Oxides and Method of Preparing the Same.

U.S. Appl. No. 08/135,228, filed Oct. 12, 1993, Richard T. Jow, Dielectric Films Having an Enhanced Dielectric Breakdown Strength and Method of Making the Films.

U.S. Appl. No. 08/073,015, filed May. 28, 1993, Richard T. Jow, Cyanoresin, Cyanoresin/Cellulose Triacetate Blends for Thin Film, Dielectric Capacitors.

U.S. Appl. No. 08/071,416, filed May 28, 1993, Richard T. Jow, Cellulose Triacetate, Thin Film Dielectric Capacitor, U.S. Appl. No. 07/513,719, filed Apr. 20, 1990, Richard T. Jow, Method of Increasing the Dielectric Constant of a Polymeric Dielectric Film.

U.S. Appl. No. 60/398,712, filed Jul. 29, 2002, Shengshui Zhang, Lithium BIS (Oxalato) Borate as an Additive for Nonaqueous Electrolyte Rechargeable Cells.

U.S. Appl. No. 60/268,516, filed Feb. 13, 2001, Shengshui Zhang, Fluorinated Alkyl Phosphate as Co–Solvent for Non–Aqueous Electrolyte and Non–Aqueous Electrolyte Cells Comprising the Same.

U.S. Appl. No. 60/267,895, filed Feb. 13, 2001, Shengshui Zhang, Non–Aqueous Electrolyte Solutions and Non–Aqueous Electrolyte Cells Comprising the Same U.S. Appl. No. 60/171,866, filed Dec. 23, 1999, Shengshui Zhang, Novel Poly–Anionic Salts for Batteries and Other Electrolytic Devices.

U.S. Appl. No. 60/140,673, filed Jun. 16, 1999, Shengshui Zhang, New Electrolytes for High Energy Lithium–Ion Batteries.

U.S. Appl. No. 10/927,181, filed Aug. 27, 2004, Shengshui Zhang, Microporous Gel Electrolyte Battery and its Process of Manufacturing.

U.S. Appl. No. 10/625,686, filed Jul. 24, 2003, Shengshui Zhang, Additive for Enhancing the Performance of Electrochemical Cells.

U.S. Appl. No. 10/307,537, filed Nov. 27, 2002, Shengshui Zhang, Solvent Systems Comprising a Mixture of Lactams and Esters for Non–Aqueous Electrolytes and Non–Aqueous Electrolyte Cells Comprising the Same.

U.S. Appl. No. 10/060,186, filed Feb. 1, 2002, Shengshui Zhang, Non–Aqueous Electrolyute Solutions Comprising Additives and Non–Aqueous Electrolye Cells Comprising the Same.

U.S. Appl. No. 10/060,165, filed Feb. 1, 2002, Shengshui Zhang, Nonflammable Non–Aqueous Electrolyte and Non-Aqueous Electrolyte Cells Comprising the Same.

U.S. Appl. No. 10/060,139, filed Feb. 1, 2002, Shengshui Zhang, Non–Aqueous Electrolyte Solutions and Non–Aqueous Electrolyte Cells Comprising the Same.

U.S. Appl. No. 09/519,062, filed Mar. 3, 2000, Shengshui Zhang, Electrochemical Cells with Cationic Polymers and Electroactive Sulfur Compounds.

U.S. Appl. No. 08/994,343, filed Dec. 19, 1997, Shengshui Zhang, Electrochemical Cells with Cationic Polymers and Electroactive Sulfur Compounds.

U.S. Appl. No. 60/470,122, filed May 13, 2003, Michael Dingman, Rotating Capacitor 45 Degree of Sensing Direction.

U.S. Appl. No. 60/469,799, filed May 12, 2003, Michael Allen Dingman, PrintedCircuit Board Stiffener to Improve Performance of Airbag Sensors.

U.S. Appl. No. 60/371,510, filed Apr. 10, 2002, Michael A. Dingman, Stain Gage Switch.

U.S. Appl. No. 60/371,478, filed Apr. 10, 2002, Michael Dingman, Remote Control System for Anti–Theft Control and to Stop a Vehicle Safely by Fuel Pump Shut Off.

U.S. Appl. No. 60/333,142, filed Nov. 27, 2001, Michael Dingman, Solvent Systems Comprising a Mixture of Lactams and Esters for Non–Aqueous Electrolytes and Non-Aqueous Electrolyte Cells Comprising the Same.

U.S. Appl. No. 60/273,694, filed Mar. 6, 2001, Michael L. Dingus, Chemically and Biologically Resistant Hydration System.

U.S. Appl. No. 60/269,478, filed Feb. 20, 2001, Michael S. Ding, Non–Aqueous Electrolyte Solutions Comprising Additives and Non–Aqueous Electrolyte Cells Comprising the Same.

U.S. Appl. No. 60/268,516, filed Feb. 13, 2001, Michael Dingman, Fluorinated Alkyl Phosphate as Co–Solvent for Non–Aqueous Electrolyte and Non–Aqueous Electrolyte Cells Comprising the Same.

U.S. Appl. No. 60/267,895, filed Feb. 13, 2001, Michael S. Ding, Non–Aqueous Electrlyte Solutions and Non–Aqueous Electrolyte Cells Comprising the Same.

U.S. Appl. No. 60/237,209, filed Oct. 2, 2000, Michael Allan Dingman, Heated Clamps for Bonding a Strain Gage to a Metal Surface.

U.S. Appl. No. 60/230,139, filed Oct. 2, 2000, Michael A. Dingman, One Piece Design for Strain Gage Flex Cable & Circuit Board.

U.S. Appl. No. 60/177,887, filed Jan. 24, 2000, Michael Allan Dingman, Belt Force Sensor.

U.S. Appl. No. 60/020,914, filed Jun. 28, 1996, Michael L. Dingus, High Density Composite Material.

U.S. Appl. No. 10/757,922, filed Jan. 14, 2004, Michael Allan Dingman, Printed Circuit Board Stiffener.

U.S. Appl. No. 10/653,338, filed Sep. 2, 2003, Michael Allan Dingman, Belt Force Sensor.

U.S. Appl. No. 10/307,537, filed Nov. 27, 2002, Michael S. Ding, Solvent Systems Comprising a Mixture of Lactams and Esters for Non–Aqueous Electrolytes and Non–Aqueous Electrolyted Cells Comprising the Same.

U.S. Appl. No. 10/092,030, filed Mar. 6, 2002, Michael L. Ding,Chemically and Biologically Resistant Hydration System.

U.S. Appl. No. 10/060,186, filed Feb. 1, 2002, Michael S. Ding, Non–Aqueous Electrolyute Solutions Comprising Additives and Non–Aqueous Electrolyte Cells Comprising the Same.

U.S. Appl. No. 10/060,165, filed Feb. 1, 2002, Michael S. Ding,Nonflammable Non–Aqueous Electrolyte and Non-Aqueous Electrolyte Cells Comprising the Same.

U.S. Appl. No. 10/060,139, filed Feb. 1, 2002, Michael S. Ding, Non–Aqueous Electrolyte Solutions and Non–Aqueous Electrolyte Cells Comprising the Same.

U.S. Appl. No. 09/888,904, filed Jun. 25, 2001, Michael Allan Dingman, Method and Apparatus for Making a Load Cell.

U.S. Appl. No. 09/888,901, filed Jun. 25, 2001, Michael Allan Dingman, Method and Apparatus For Makin a Load Cell.

U.S. Appl. No. 09/783,491, filed Feb. 14, 2001, Michael J. Ding, User Controllable Data Grouping in Structural Document Translation.

U.S. Appl. No. 09/767,973, filed Jan. 23, 2001, Michael Allan Dingman, Belt Force Sensor.

U.S. Appl. No. 09/454,899, filed Dec. 3, 1999, Michael L. Ding, High Density Composite Material.

U.S. Appl. No. 09/046,585, filed Mar. 24, 1998, Michael Estment Dingle, Underwater Mining Machine.

U.S. Appl. No. 08/884,001, filed Jun. 27, 1997, Michael L. Dingus, High Density Composite Material.

U.S. Appl. No. 08/369,548, filed Jan. 6, 1995, Michael L. Dingus, Methods and Compositions for Cleaning and Decontamination.

U.S. Appl. No. 08/054,315, filed Apr. 27, 1993, Michael L. Dingus, Perforated Plate Filter Media and Related Products.

* cited by examiner

NONFLAMMABLE NON-AQUEOUS ELECTROLYTE AND NON-AQUEOUS ELECTROLYTE CELLS COMPRISING THE SAME

CROSS-REFERENCE TO RELATED APPLICATION

This application claims the benefit of U.S. Provisional Application No. 60/268,516, filed Feb. 13, 2001; Ser. No. 60/267,895, filed Feb. 13, 2001; and Ser. No. 60/269,478, filed Feb. 20, 2001; each of which is incorporated by reference in its entirety.

GOVERNMENT INTEREST

The invention described herein may be manufactured, used and/or licensed by or for the United States Government.

BACKGROUND OF THE INVENTION

1. Field of the Invention

The present invention relates to high energy, non-aqueous electrolyte based electrochemical energy storage devices such as high energy density batteries or high power electrochemical capacitors which are non-flammable. More particularly, this invention relates to non-flammable high energy, non-aqueous electrolyte based electrochemical energy storage devices containing an electrolyte solution including alkyl phosphate, which afford protection of the electrodes from the electrolyte at wide temperature ranges, and reduce ignition risks.

2. Discussion of the Prior Art

High voltage and high energy density rechargeable batteries based on non-aqueous electrolyte solutions are widely used as electric sources for various types of consumer electronic appliances, such as camcorders, notebook computers, and cell phones, because of their high voltage and high energy density as well as their reliability such as storage characteristics. This type of battery conventionally employs the complexed oxides of lithium and a transition metal as positive electrode, such as $LiCoO_2$, $LiNiO_2$, $LiMn_2O_4$, and variations of the previous oxides with different dopants and different stoichiometry, and additionally includes lithium metal, lithium alloys and/or carbonaceous materials as a negative electrode. Chosen over the lithium metal and lithium alloys are carbonaceous negative electrode materials, which are in general partially or fully graphitized and specially modified natural graphite. When a carbonaceous negative electrode is used, this battery is often referred to as a lithium-ion (Li-ion) battery, because no pure lithium metal is present in the negative electrode. During charge and discharge processes, the lithium ions are intercalated into and de-intercalated from the carbonaceous negative electrode, respectively. The advantages of using these negative electrodes is that problems associated with growth of lithium metal dendrites is avoided. Such dendrites are often observed in lithium or lithium alloy negative electrodes, and is known to cause short-circuiting of the cells.

Battery manufacturers have been trying to replace the widely used electrolyte solvent ethylene carbonate (EC) with propylene carbonate (PC), because the latter is cheaper and also improves low-temperature performance. However, the high power negative electrode material graphite is known to disintegrate in presence of PC (a process called "exfoliation"), and accordingly destroys battery performance.

It is recognized that the Li-ion cells work well in the carbonate solvent systems. This is due to the protection film formation on the carbon electrodes in the carbonate solvent system, as described in Koshina et al., "Relationship between Electrolyte and Graphite Electrode in Lithium Ion Batteries," Proc. 1$^{st}$ Hawaii Battery Conference, Big Island of Hawaii, 5–7 Jan. 1998, herein incorporated by reference in its entirety. Upon the first charge of the lithium ion cell, the electrolyte decomposes at both anode and cathode, and the consequent decomposition product forms a dense film covering the aforementioned electrode surface. This film is permeable only to migrating lithium ions, but insulating to electrons. Therefore, the stability of this protection film constitutes the foundation on which the lithium ion battery functions. The ability of this film to resist dissolution into the carbonate-based solvents at different temperatures is a key-factor to the capacity retention and life cycle of the cell under different application environments. The carbonate-based electrolyte works well in a temperature range from −20 to 50° C. Recent studies of the liquidus temperature ranges of the binary carbonate systems, such as Ding et al., "Liquid-Solid Phase Diagrams of Binary Carbonates for Lithium Batteries," J. Electrochem. Soc., 147 (5), 1688 (2000), herein incorporated by reference in its entirety, have shown that, the electrolyte freezes at temperatures below −20° C. To extend the temperature range to lower temperatures, it has been suggested, as described in Plichta et al., "Low Temperature Electrolyte for Lithium and Lithium-Ion Batteries," Proc. 38$^{th}$ Power Sources Conference, p. 444, Cherry Hill, N.J., 8–11 Jun. 1998, and Smart et al., "Development of High Conductivity Lithium-ion Electrolytes for Low Temperature Cell Applications," Proc. 38$^{th}$ Power Sources Conference, p. 452, Cherry Hill, N.J., 8–11 Jun. 1998 (each of which is hereby incorporated by reference in its entirety) to employ ternary solvent systems. As shown by Plichta et al., this approach works for a pure Li metal anode but it does not work properly for carbonaceous anode due to the high cell impedance involved at sub-ambient temperatures. This is because the film formed on the pure Li metal is different from that formed on the carbon surfaces.

Capacity loss as a result of high temperature storage and capacity fading when the cell is cycled at elevated temperatures are also problems in known Li-ion batteries. The protection layer that is believed to be formed in a mixture of one or two cyclic carbonates and one or more linear carbonates containing a lithium salt becomes eventually unstable at elevated temperatures, such that new films must be formed in each charging cycle, causing progressively fading capacity.

It is therefore desirable to have an electrolyte that can react with electrodes upon charge and form a better protection layer on either the anode or the cathode than those are formed by the mixture of cyclic and linear carbonates. It is more advantageous to have an electrolyte that can form better protection layers on both electrodes simultaneously. An electrolyte co-solvent, such as an organofluorine-containing compound, which has a C—F covalent bond that is both chemically and electrochemically inert and that will stay in the protection film after the compound is electrochemically decomposed on either electrodes, can potentially provide the best reaction product for the protection film on electrodes in highly oxidative and reductive reaction environment of Li batteries and Li-ion batteries, because organofluorine compounds are more resistant to salvation by carbonate solvent systems, in addition to its chemical/electrochemical stability.

The efforts of searching for such an electrolyte along this line of thought have been reported by others. For example, Nakano et al. in U.S. Pat. No. 5,750,730, herein incorporated by reference in its entirety, provided a fluorine-containing dioxolane compound is provided to improve charge and discharge cycle life of lithium rechargeable batteries or electric double layer capacitors. Besenhard et al. in U.S. Pat. No. 5,916,708, herein incorporated by reference in its entirety, provided partially fluorinated ethers that can enhance the safety of rechargeable lithium cells. Yokoyama et al. in U.S. Pat. No. 6,010,806, herein incorporated by reference in is entirety, provided fluoromethyl ethylene carbonate, which is excellent in voltage and charge and discharge cycle characteristics. These fluorinated compounds are very specific in that both the location and the degree of fluorination must be elaborately chosen so that the properties of the formed protection films can afford the expected properties. However, each of these systems exhibit problems related to flammability and ignition of the electrolyte solution.

Alkyl phosphates as a class of compound have been considered as flame retardants for lithium/lithium ion cells as is disclosed by Yokoyama et al in U.S. Pat. No. 5,580,684 and Narang et al in U.S. Pat. No. 5,830,600, both of which are incorporated by reference in their entireties. However, as will be described herein, the resulting electrolytes and electrolyte cells nevertheless are, in fact, flammable. Yokoyama et al. attempts to solve the flammability problem by providing a self-extinguishing electrolyte, which does initially ignite. Therefore, although the risk of flammability is reduced by the electrolyte of Yokoyama et al., there is nevertheless, ignition and the potential for flare-ups.

SUMMARY OF THE INVENTION

The present invention pertains to non-aqueous electrolyte system for a lithium or lithium ion battery, based on a lithium metal, lithium-alloy or a carbonaceous material as the anode, and a lithiated metal oxide as cathode. More specifically, this invention pertains to a series of electrolyte co-solvents, which are based on fluorinated alkyl phosphates in the general structural formula I:

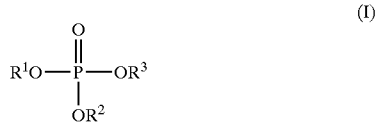

wherein $R^1$, $R^2$, and $R^3$ may be the same or different, are normal or branched alkyl groups of carbon numbers between 1 and 5.

Still more specifically, it is preferred that at least one of the three alkyl groups is fluorinated, with the locations of the fluorination being at least β-positioned away from the phosphorus atom and the fluorination degree being high enough to provide an effective protecting film on both the anode and the cathode.

Still more specifically, the fluorination degree, as defined by a F/H ratio, which is the ratio between the number of alkyl fluorine atoms and the remaining alkyl hydrogen atoms, can be at least higher than 0.25 so that protecting film formed on anode will be both stable and effective.

Fluorination in compliance with the above specifics can form protection layers on not only the anode but also the cathode. Consequently, the problems relating to storage life and capacity fading at elevated temperature in Li-ion batteries have been minimized.

Therefore, an object of the present invention is to provide a series of new fluorinated alkyl phosphates as co-solvents for non-aqueous electrolytes, which is preferred for non-aqueous electrolyte rechargeable batteries. It is another object of the present invention to provide non-aqueous electrolyte system based on the solution of a lithium salt dissolved in one or more cyclic carbonate, and one or more linear carbonate and one or more afore-mentioned phosphates. It is further an object of the present invention to provide a rechargeable lithium battery or lithium ion battery systems using the afore-mentioned electrolyte systems, which afford improved capacity utilization, high capacity retention, improved rate capability, long storage life and low capacity retention at elevated temperatures, as well as non-flammability.

In this invention, a series of fluorinated compounds based on alkyl phosphates are provided which are fluorinated at specific alkyl locations with specific degree of fluorination. Further provided are non-aqueous electrolytes consisting of the afore-mentioned fluorinated alkyl phosphate as a co-solvent in a mixture of cyclic and linear alkyl carbonates with a lithium salt. The electrolyte fabricated in accordance with the present invention can form more stable protection films on both the anode and the cathode of both the lithium and lithium-ion cell simultaneously. As a result, the lithium and lithium-ion cells using such electrolytes exhibit improved charge/discharge capacity, improved charge/discharge cycle life and improved rate capabilities, at room temperatures and above, as compared to the cells without the co-solvents. The lithium and lithium-ion cells using such electrolytes further showed substantial improvement in safety with respect to applications at elevated temperature and abuse as well as accidents.

While introducing flame retarding ability to the lithium cells, the present invention improves the cell performance simultaneously by tailoring the structure of the phosphates as not demonstrated by conventional batteries. The present applicants have discovered that fluorinated alkyl phosphates, wherein both the location of fluorination on the alky substituents and fluorine/hydrogen ratio are as described in this invention, will work in the high voltage lithium/lithium ion cells using highly oxidative cathode and highly reductive anode, and especially in lithium ion cells where highly sensitive carbonaceous material is used as anode.

Additional objects, features and advantages of the present invention will become more fully apparent from the following detailed description of preferred embodiments, when taken in conjunction with the drawings wherein like reference numerals refer to corresponding parts in the several views.

DETAILED DESCRIPTION OF THE PREFERRED EMBODIMENTS

Figure 1:
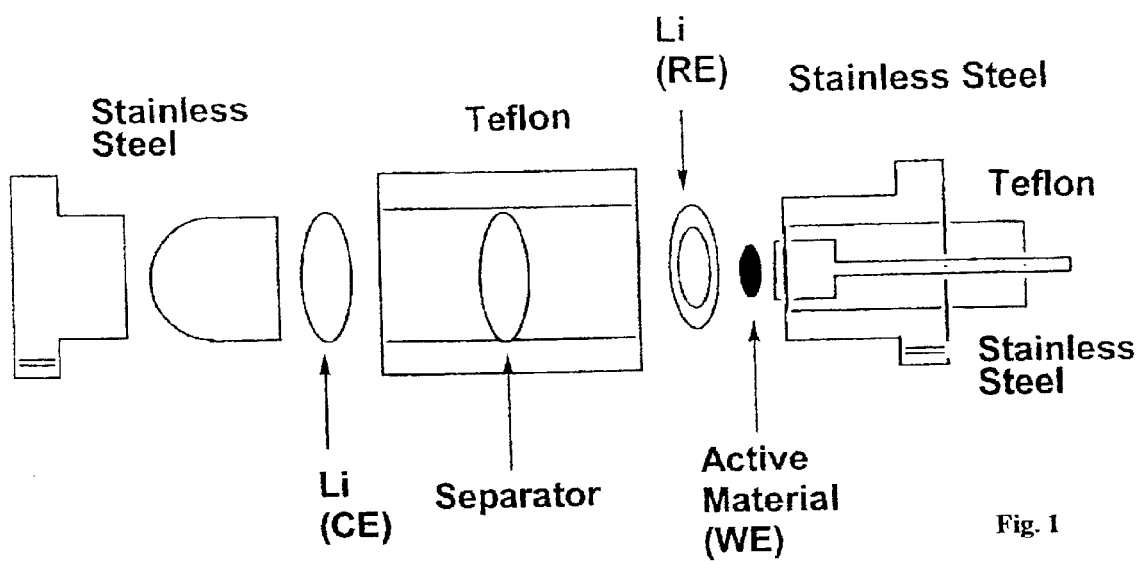
FIG. 1 shows an electrode configuration used for cyclic voltaimetry (CV) tests.

The present invention provides specific fluorinated alkyl phosphates of the general formula I,

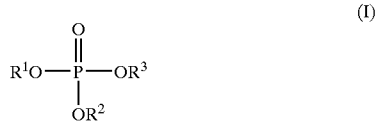

(I)

wherein $R^1$, $R^2$, and $R^3$ may be the same or different, are normal or branched alkyl groups of carbon numbers between 1 and 5. Specific fluorination of the alkyls $R^1$, $R^2$, and $R^3$ is preferred to realize the full extent of the benefits of the invention, with respect to both the fluorination location and the degree of fluorination.

It is preferred that at least one of these three alkyl groups is fluorinated, with the locations of the fluorination being at least β-positioned away from phosphorus and the F/H ratio being at least 0.25, preferably greater than 0.25. More preferably, at least two of these three alkyl groups are fluorinated, with the degree of fluorination being at least ¾ of the total substitutable alkyl protons.

As used herein "POF" is used to designate the fluorinated alkyl phosphates in compliance with the above specifics. Examples of fluorinated alkyl phosphate according to the present invention include, but are not limited to tris (trifluoroethyl)phosphate (POF-I), bis(trifluoroethyl)methyl phosphate (POF-II), diethyltrifluoroethyl phosphate (POF-III), and tris(1,1,1,3,3,3-hexafluoro-2-propyl)phosphate (POF-IV).

The synthesis of a fluorinated alkyl phosphate in accordance with the present invention is explained as follows, which are offered by way of illustration and not by way of limitation.

The present invention further provides non-aqueous electrolytes consisting of a fluorinated alkyl phosphate as a co-solvent and a mixture of cyclic carbonates of general formula II and linear carbonates of general formula III:

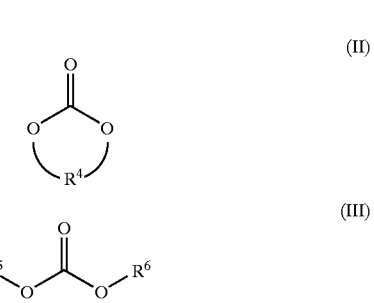

wherein $R^4$ is normal or branched alkylene of carbon numbers between 2 and 5, and $R^5$ and $R^6$ may be the same or different, are normal or branched alkyl groups of carbon numbers between 1 and 5. Non-aqueous electrolytes used in accordance with lithium-ion batteries of the present invention contain a solvent system that, in general, includes a cyclic carbonate compound, such as ethylene carbonate (EC) and propylene carbonate (PC), as well as a linear carbonate, such as dimethyl carbonate (DMC), diethyl carbonate (DEC), and ethylmethyl carbonate (EMC). The cyclic carbonates are chemically and physically stable and have high dielectric constant, which is necessary for their ability to dissolve salts. The linear carbonates are also chemically and physically stable and have low dielectric constant and low viscosity, which is necessary to increase the mobility of the lithium ions in the electrolytes. "PC-based electrolyte systems" contain PC as one of the components and, when the only cyclic carbonate present is EC, the electrolyte system is considered "EC-based".

Preferably, the mixture of either ethylene carbonate ($R^4$ is ethylene in formula II) or propylene carbonate ($R^4$ is methylethylene in formula II) with either dimethylcarbonate ($R^5$ and $R^6$ are methyl in formula III), diethylcarbonate ($R^5$ and $R^6$ are ethyl in formula III) or ethylmethylcarbonate ($R^5$ and $R^6$ are methyl and ethyl, respectively, in formula III) is used to constitute the carbonate solvent system, and a lithium salt, is dissolved into the solvent system, and one or more of fluorinated alkyl phosphates of general formula I is used as co-solvent, with the weight parts ranging between 5% to 80%.

The solutes used in the present invention may be lithium salts, such as lithium hexafluorophosphate (LiPF$_6$), lithium imide (LiN(SO$_3$CF$_3$)$_2$), lithium trifluorosulfonate (LiCF$_3$SO$_3$), lithium hexafluoroarsenate (LiAsF$_6$), and lithium tetrafluoroborate (LiBF$_4$). LiPF$_6$ is preferred.

Control examples of alkyl phosphates without fluorination, i.e. trimethyl phosphate (TMP) and triethyl phosphate (TEP), are used as comparison to electrolytes of the present invention. As is described below, the alkyl phosphate in accordance with the present invention achieves the advantages of the invention, including improved charge/discharge capacity, cycle life, rate capability, storage life, and non-flammability. This will become clear as shown in the following examples, which are offered by way of illustration and not by way of limitation.

EXAMPLE 1

Synthesis of tris(trifluoroethyl) Phosphate (POF-I)

122.65 g (0.80 mole) phosphorus oxychloride (POCl$_3$, Aldrich, 99%) was added drop-wise to a mixture of 400 mL dry acetonitrile (Aldrich 99%), 253 g (2.50 mole) triethylamine (TCI, 99%), and 250 g (2.50 mole) trifluoroethanol (Lancaster, 99+%) under vehement stirring at about 0–5° C. After the addition was completed, the mixture was refluxed for 1 hour. Ammonium salt was filtered and filtrate was washed by NaCl saturated distilled water. The resultant organic phase was dried over $MgSO_4$ and then fractionated 3 times. Final distillates of POF-I between 188 and 193° C. were collected.

$^1$H-NMR: 4.433(quintuplet, $J_{P-H}$=8.002 Hz); $^{13}$C-NMR: 122.01 (octet, $J_{C-P}$=10.06 Hz, $J_{C-F}$=277.33 Hz); 64.261 (octet, $J_{C-P}$=4.276 Hz, $J_{C-F}$=38.61 Hz); $^{19}$F-NMR: −76.78 (triplet, $J_{F-H}$=8.00 Hz); $^{31}$P-NMR: −2.538 (singlet).

The purified POF-I was further dried over neutral alumina in a glove box before being used as an electrolyte solvent. Karl-Fischer titration indicated a 10–15 ppm moisture content.

EXAMPLE 2

Synthesis of bis(trifluoroethyl)methyl Phosphate (POF-II)

100 g (0.67 mole) Methyldichlorophosphate ($MePOCl_2$, Aldrich, 97%) was added drop-wise to a mixture of 300 mL anhydrous ether (Fischer, 99%), 131.93 g (1.67 mole) pyridine (Aldrich, 99%), and 167.6 g (1.67 mole) trifluoroethanol (Lancaster, 99+%) under vehement stirring at approximately 0–5° C. After addition was completed, the mixture was refluxed for 2 hours. The reaction mixture was cooled in refrigerator and pyridinium salt was then filtered. The filtrate was washed first by 10% sulfuric acid solution in NaCl saturated distilled water and then by NaCl saturated distilled water alone until a of pH approximately 7.0 was realized. The resultant organic phase was dried over $MgSO_4$ and then fractionated 3 times. Final distillates of POF-II between 48 and 53° C./1.0 mmHg were collected.

$^1$H-NMR: 1.02 (singlet, 3H); 4.321 (quintuplet, $J_{P-H}$=8.40 Hz, 4H); $^{13}$C-NMR: 15.70 (doublet, $J_{P-C}$=7.00 Hz); 65.00 (quartet, $J_{F-C}$=127.0 Hz, $J_{P-C}$=4.02 Hz); $^{19}$F-NMR: 74.7 (singlet); $^{31}$P-NMR: −1.340 (octet, $J_{P-H}$=8.10 Hz).

MS: 276 ($M^+$); 245 (M—$OCH_3$); 225 (M–HF—$OCH_3$).

The purified POF-II was further dried over neutral alumina in a glove box before being used as the electrolyte solvent. Karl-Fischer titration indicated a 10–15 ppm moisture content.

EXAMPLE 3

Synthesis of Diethyltrifluoroethyl Phosphate (POF-III)

100 g (0.5795 mole) diethyl chlorophosphate ($Et_2POCl$, Aldrich, 97%) was added drop-wise to a mixture of 300 ml dry acetonitrile (Aldrich, 99%), 45.36 g (0.62 mole) diethylmethylamine (TCI, 99+%), and 57.97 g (0.58 mole) trifluoroethanol (Lancaster, 99%) under vehement stirring. After the addition was completed, the mixture was refluxed for 2 hours. Ammonium salt was filtered and the filtrate was fractionated 3 times. Final distillates of POF-III between 80–82° C./2.5 mmHg were collected.

$^1$H-NMR: 1.37 (triplet, $J_{H-H}$=4.006 Hz, 6H); 4.169 (quintuplet, $J_{P-H}$=7.60 Hz, 4H); 4.351 (quintuplet, $J_{P-H}$=8.40 Hz, 2H); $^{13}$C-NMR: 15.74 (doublet, $J_{P-C}$=7.04 Hz); 63.12 (quartet, $J_{F-C}$=126.77 Hz, $J_{P-C}$=4.02 Hz); 64.24 (singlet, $J_{P-C}$=6.03 Hz); $^{19}$F-NMR: 74.7 (singlet); $^{31}$P-NMR: −1.337 (heptet, $J_{P-H}$=7.936 Hz).

MS: 236 ($M^+$); 221 (M—$CH_3$); 209 (M—$C_2H_4$); 181 (M—$C_4H_8$).

EXAMPLE 4

Synthesis of tris(1,1,1,3,3,3-hexafluoro-2-propyl) phosphate (POF-IV)

POF-IV is synthesized in a similar manner. LiH, 6.89 g (0.86 mole) was slowly added to a mixture of 500 mL ether and 146.0 g (0.86 mole) 1,1,1-3,3,3-hexafluoro-2-propanol under vehement stirring. After the completion of $H_2$ development, 42.92 g (0.28 mole) $POCl_3$ was added to the alkoxide. $LiCl_2$ was removed via filtration. The filtrate was then distilled to remove the excess solvent. The oily produce was then left to dry over $MgSO_4$ and fractioned two times. After drying, the product (POV-IV) was analyzed by spectroscopy and Karl-Fisher titration. $H_2O$ was found to be less than 5 ppm, and the spectroscopy confirmed the structure.

EXAMPLE 5

Preparation of Non-Aqueous Electrolyte Systems

All the procedures in which the dried solvents, lithium salts and electrolyte solutions were handled were carried out in glove-boxes, where relative humidity was maintained below 5 ppm and oxygen level below 10 ppm. Ethylene carbonate and ethylmethyl carbonate (electrolyte grade, Grant Chemicals Inc.) were mixed according to specific ratios and subjected to Karl-Fischer titration. The resulting moisture content was below 10 ppm in all cases. POFs were added according to different desired weight percentages, in a range from 5% to 80%. After thorough mixing, 1.0 molality of $LiPF_6$ was weighed into the solvent mixture. The solution was shaken occasionally to accelerate the salt dissolution.

EXAMPLE 6

Assembly of Cells for Cyclic Voltammetry and Constant Current Cycling Tests

Carbonaceous anode and Lithium metal oxide cathode material were coated onto copper and aluminum substrates, so that the unit area capacity was 0.93 mAh/cm$^2$. The electrodes were cut into discs of 1.27 cm$^2$ (anode) and 0.97 cm$^2$ (cathode) for use. Celgard 2400 was used in all cases as separator.

Three configuration of the electrode configuration for cyclic voltammetry tests (CV) is shown in FIG. 1. The CV tests were conducted at slow scan (<0.1 mV/s) to study the electrochemical reactions of the electrolyte on either anode or cathode working electrode. The potential of the working electrode was controlled and the current monitored by an EG&G potentiostat Model 273, and the potential ranges studied are between open circuit potential (OCV) and 0.1 V (vs. $Li^+$/Li) for the anode, and between OCV and 4.3 V for the cathode.

Figure 2:
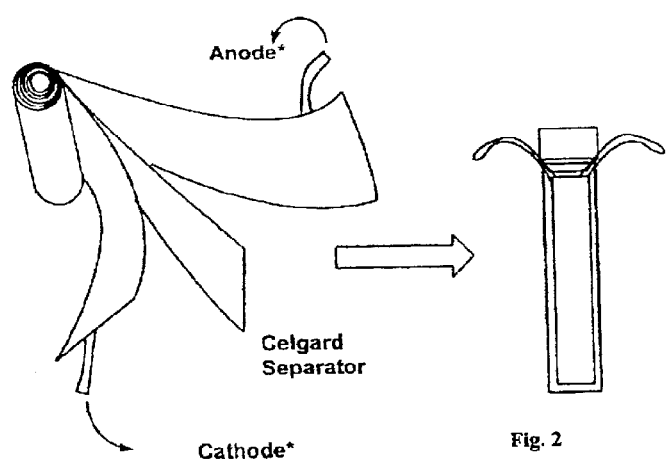
FIG. 2 is an exploded view of lithium-ion cells in vial cell design, constructed in accordance with the present invention.

Full lithium ion cells vial cell, whose structure is shown in FIG. 2, or button cell design (structure shown in FIG. 3) were used to study cycling behavior of the non-aqueous electrolyte system in the full cell after the electrolyte was vacuum-filled onto the electrodes/separator in a separate chamber. Constant current cycling was conducted on a Maccor Battery Cycler Model 4000 between 2.5 V and 3.9 V, using drain rates ranging from C/10 to 3 C, equivalent of 0.1 mA/cm$^2$ to 2.8 mA/cm$^2$.

EXAMPLE 7

Film Formation Ability of Electrolyte Systems Containing Fluorinated Alkyl Phosphates on Carbonaceous Anode Table 1 shows the effect of specific fluorination on formation of protection film on the anode.

The coulombic efficiency (CE) of the lithium ion intercalation/de-intercalation on the anode in electrolyte solutions is extracted from CV experiments and listed in Table 1. For an electrolyte solution containing POF-I, where F/H ratio is 1.5, from 5 weight percent up to 40 weight percent, the CE at the first cycle was always lower than 100%, suggesting that POF-I reacts with the carbon anode to form a film of decomposition product on electrode surface. The CE that increased to 100% in the subsequent cycles suggests that a film is formed and is protecting the carbon anode. In longer term cell performance as well as storage, the advantage of possessing such films will be shown.

The CE for an electrolyte containing POF-II, having a F/H ratio is 0.86, shows similar behavior as the interaction of POF-I on its anode. Both POF-I and POF-II in a very broad range of weight percentages (5%-approximately 40%) show this ability to form the stable protecting film on a carbonaceous anode (Table 1).

POF-III, having a F/H ratio of 0.25, forms a far less effective protecting film on the anode, as Table 1 shows. At weight percentages close to or below 20%, a stable film fails to form, and electrolyte decomposition accompanied with electrode exfoliation occurs, as indicated by the lack of $Li^+$-intercalation in subsequent cycles. Electrolyte systems containing less POF-III, e.g., 5–10%, do support $Li^+$-intercalation, but the film is not stable in longer term, as it will be shown in cell cycling results.

TABLE 1

| Electrolyte Systems | CE (%) of the $1^{st}$ cycle | CE (%) at the 2nd–4th cycles |
| --- | --- | --- |
| 1 m $LiPF_6$/EC-EMC (1:1) | 86 | 100 ($2^{nd}$), 100 ($3^{rd}$), 99 ($4^{th}$) |
| 1 m $LiPF_6$/EC-EMC (1:1) + 5% POF-I | 84 | 99 ($2^{nd}$), 100 ($3^{rd}$) |
| 1 m $LiPF_6$/EC-EMC (1:1) + 10% POF-I | 89 | 99 ($2^{nd}$), 100 ($3^{rd}$) |
| 1 m $LiPF_6$/EC-EMC (1:1) + 15% POF-I | 88 | 98 ($2^{nd}$), 100 ($3^{rd}$) |
| 1 m $LiPF_6$/EC-EMC (1:1) + 20% POF-I | 92 | 100 ($2^{nd}$), 100 ($3^{rd}$) |
| 1 M $LiPF_6$/EC-EMC-POF-I (1:1:1) | 95 | 97 ($2^{nd}$), 100 ($3^{rd}$) |
| 1 m $LiPF_6$/EC-EMC-POF-I (20:40:40) | 92 | 99 ($2^{nd}$), 100 ($3^{rd}$) |
| 1 m $LiPF_6$/EC-EMC-POF-II (20:40:40) | 89 | 100 ($2^{nd}$), 100 ($3^{rd}$) |
| 1 m $LiPF_6$/EC-EMC (1:1) + 10% POF-III | 88 | 96 ($2^{nd}$), 100 ($3^{rd}$) |
| 1 m $LiPF_6$/EC-EMC (1:1) + 20% POF-III | 110 | No Li+-intercalation since $2^{nd}$ cycle. |
| 1 M $LiPF_6$/EC-EMC (1:1) + 5% TEP | 102 | 110 ($2^{nd}$), 110 ($3^{rd}$) |
| 1 M $LiPF_6$/EC-EMC-TEP (1:1:1) | ~200 | No Li+-intercalation since 1st cycle. |
| 1 M $LiPF_6$/EC-EMC-TMP (1:1:1) | >200 | No Li+-intercalation since 1st cycle. |

COMPARATIVE EXAMPLE 7

Film Formation Ability of Electrolyte Systems Containing Non-Fluorinated Alkyl Phosphate on Carbonaceous Anode The control phosphates, i.e. triethyl phosphate (TEP) and trimethyl phosphate (TMP), which are non-fluorinated and whose F/H ratios are both 0, show poor film-forming ability on carbonaceous anodes. As shown in Table 1 the CE at the first cycle reached over 200% when the TEP or TMP content in electrolyte was 33%. This larger than unity CE indicates substantial electrolyte decomposition and severe electrode exfoliation occurred during the back scan, i.e., when the potential of working electrode is being raised from the Li+-intercalation potential. This behavior is similar to POF-III but is more severe, without the protection from alkyl fluorine.

Thus, the effect of fluorination on the ability of the electrolyte systems containing these fluorinated phosphates of this invention to form anode-protecting film is clear and confirmed, as it will be further confirmed by the following examples.

EXAMPLE 8

Stability of Electrolyte Systems Containing Fluorinated Alkyl Phosphate on Lithiated Transition Metal Oxide Cathodes The stability of electrolyte systems containing the fluorinated phosphates of this invention on lithiated transition metal oxide cathodes such as $Li_xNi_yCo_2O_2$ was evaluated, using a similar CV technique as described in Example 6. The CE data extracted from these CV experiments for various electrolyte compositions are shown in Table 2.

TABLE 2

| Electrolyte Systems | CE (%) of the $1^{st}$ cycle | CE (%) at the 2nd–3rd cycles |
| --- | --- | --- |
| 1 m $LiPF_6$/EC-EMC (1:1) | 97 | 100 ($2^{nd}$), 100 ($3^{rd}$) |
| 1 m $LiPF_6$/EC-EMC (1:1) + 15% POF-I | 93 | 99 ($2^{nd}$), 100 ($3^{rd}$) |
| 1 m $LiPF_6$/EC-EMC (1:2) + 44% POF-I | 98 | 100 ($2^{nd}$), 100 ($3^{rd}$) |
| 1 m $LiPF_6$/EC-EMC (1:2) + 44% POF-II | 92 | 100 ($2^{nd}$), 100 ($3^{rd}$) |
| 1 m $LiPF_6$/EC-EMC (1:1) + 10% TEP | 77 | 76 ($2^{nd}$), 82 ($3^{rd}$) |
| 1 m $LiPF_6$/EC-EMC (1:1) + 15% TMP | 88 | 90 ($2^{nd}$), 92 ($3^{rd}$) |

As can be seen clearly from Table 2, electrolyte systems containing alkyl phosphates of this invention are as stable against oxidative decomposition on the lithiated metal oxide cathode as the control electrolytes without phosphates according to this invention.

COMPARATIVE EXAMPLE 8

Stability of Electrolyte Systems Containing Non-Fluorinated Alkyl Phosphate on Lithiated Transition Metal Oxide Cathodes Control phosphates were compared with the alkyl phosphates of this invention. As Table 2 shows, both TEP and TMP are not stable against decomposition on lithiated metal oxide cathode. TEP and TMP are oxidized continuously on the charged cathode surface at about 4.0 V vs. $Li^+$/Li. Obviously, the reason for the alkyl phosphates of this invention to remain stable on the cathode is the specific fluorination at these certain locations and to certain degree.

EXAMPLE 9

Discharge Capacity of Lithium Ion Cells as a Function of Cycle Number in Non-Aqueous Electrolyte Solution Containing Fluorinated Alkyl Phosphate From the above examples and their comparative examples, we demonstrated that the compounds according to the present invention are stable with not only the highly reductive carbonaceous anode material at potentials near $Li/Li^+$ but also with the highly oxidative cathode materials at potentials above 4.3 V versus $Li/Li^+$. To further demonstrate the utility of the present invention, a full cell was used to demonstrate the stability and other benefits of using compounds of the present invention.

Figure 3:
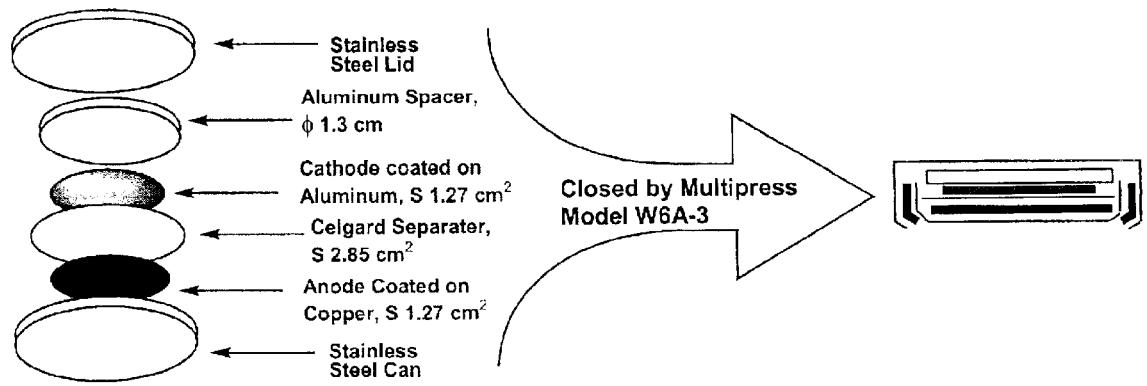
FIG. 3 is an exploded view of lithium-ion cells in a button cell design, constructed in accordance with the present invention.

The full cells tested were made of the anode and the cathode as indicated by Example 6. The cells were constructed either in the vial cell (FIG. 2) or in the button cell design (FIG. 3). The results are found to be irrespective of cell design.

Figure 4:
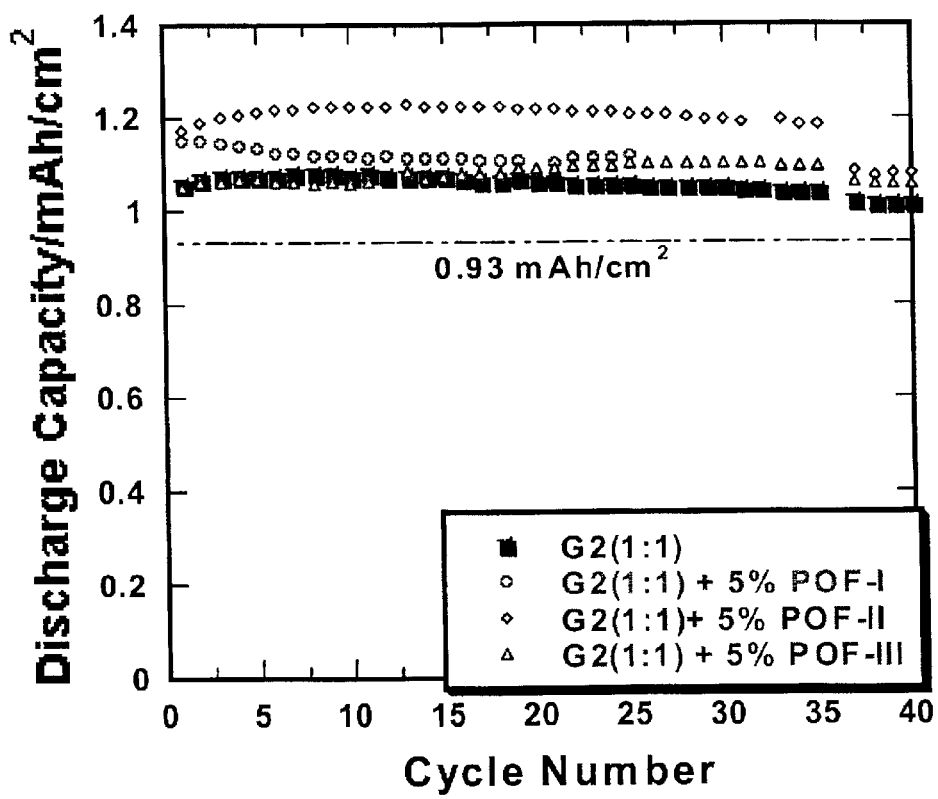
FIG. 4 is a graph showing the effect of 5% POFs I, II and III on the discharge capacity of full lithium ion cells using binary electrolyte systems EC/EMC with 1.0 m $LiPF_6$.

FIG. 4 shows the effect of 5% POFs I–III on the discharge capacity of the full cells, with the electrolyte containing no POF as control. Clearly, the presence of POFs I, II or III at the specified concentration levels results in improved the utilization of the electrode material, with reasonable retention.

Figure 5:
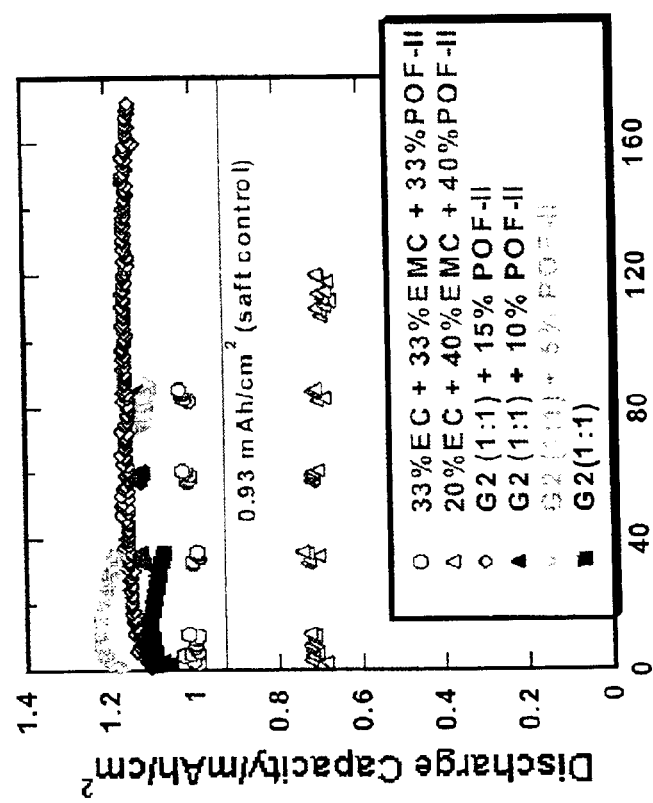
FIG. 5 is a graph showing the effect of POF-II's weight percentage in the electrolyte system on discharge capacity of full lithium ion cells.

FIG. 5 shows the effect of POF-II's concentration in the electrolyte system on the cell discharge capacity. Clearly, the capacity is improved with as little as 5% POF-II, but both capacity and capacity retention are improved at the weight percentage between 10 to 20%. More preferably, 15% of POF-II by weight in the electrolyte system is the optimum co-solvent with respect to both capacity utilization and stability of the protecting film.

Figure 6:
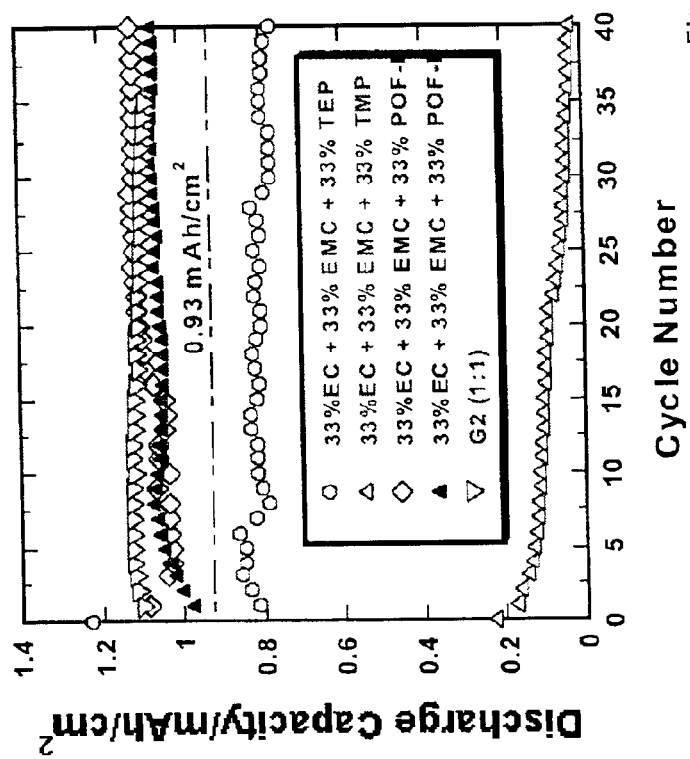
FIG. 6 is a graph comparing high content (33% by weight) of POF-I and II against control electrolyte system in discharge capacity of a lithium ion cell.

FIG. 6 shows the comparison of high content (33% by weight) of POF-I and II against control in cell discharge capacity. At this elevated level the capacity retention is increased, due to the more stable protecting films formed on both electrodes.

COMPARATIVE EXAMPLE 9

Discharge Capacity of Lithium Ion Cells as a Function of Cycle Number in Non-Aqueous Electrolyte Solution Containing TEP or TMP FIG. 6 also compares the discharge capacity of lithium ion cells with electrolyte systems containing control phosphates TEP and TMP against these containing the phosphates of this invention. The graph of FIG. 6 indicates that poorer capacity as well as faster fading rate result from these non-fluorinated phosphates, a result from the unstable protection film without organo-fluorine. For TMP the capacity fades to approximately 50% of the original value in 30 cycles, while for TEP the capacity level remains approximately 20% lower than the control electrolyte without any phosphate co-solvent. This confirmed the CV results in Examples 7 and 8 that TEP and TMP are not stable on either carbonaceous anode or lithium metal oxide cathode.

Table 3 lists the discharge capacity of the cells using electrolyte systems containing control phosphates TEP and TMP and phosphates of this invention.

TABLE 3

| Electrolyte Systems | Discharge Capacity of 1$^{st}$ cycle (mAh/cm$^2$) | Discharge Capacity of 50$^{th}$ Cycle as % of 1$^{st}$ Cycle |
| --- | --- | --- |
| 1 M LiPF$_6$/EC-EMC (1:1) | 1.1 | 85 |
| 1 M LiPF$_6$/EC-EMC (1:1) + 10% POF-I | 1.13 | ~100 |
| 1 M LiPF$_6$/EC-EMC (1:1) + 15% POF-I | 1.15 | 102 |
| 1 M LiPF$_6$/EC-EMC (1:1) + 10% POF-II | 1.16 | 100 |
| 1 M LiPF$_6$/EC-EMC (1:1) + 15% POF-II | 1.18 | 101 |
| 1 M LiPF$_6$/EC-EMC (1:1) + 5% TEP | 0.80 | 70 |
| 1 M LiPF$_6$/EC-EMC (1:1) + 10% TEP | 0.85 | 75 |
| 1 M LiPF$_6$/EC-EMC (1:1) + 10% TMP | 0.56 | 58 |

EXAMPLE 10

Capacity Retention of Full Cells Comprising Electrolytes Containing POFs

Tables 3 and 4 list relevant capacity retention data in the second column for electrolyte systems containing various percentages of alkyl phosphates of the present invention, from 10% to approximately 40%. Clearly, the presence of the phosphate co-solvents of this invention above 10% weight percentage steadily maintains a satisfactory capacity retention.

Figure 7:
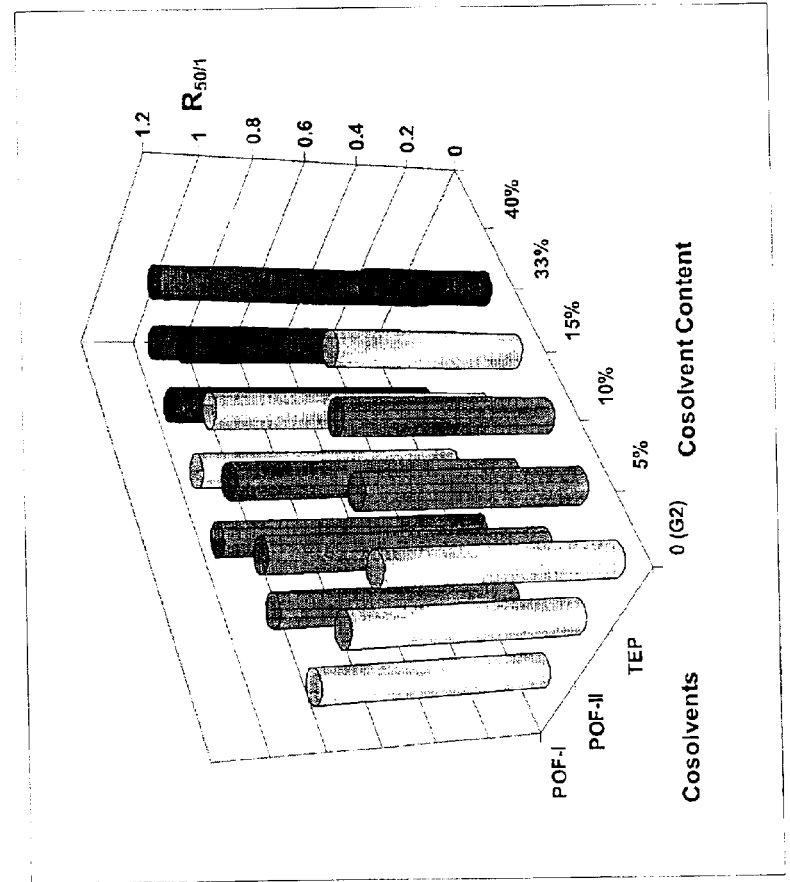
FIG. 7 is a three-dimensional graph showing the effect of POFs on the capacity retention of lithium ion cells.

FIG. 7 illustratively supports the preceding conclusion on the effect of POFs-concentrations on the cell capacity retention. Here retention is defined as the ratio between the capacity at 50$^{th}$ cycle and capacity of the first cycle.

COMPARATIVE EXAMPLE 10

Capacity Retention of Full Cell Comprising Electrolytes Containing TEP and TMP

FIG. 7 also shows as control the capacity retention values for electrolyte systems containing the TEP. Consistent with the conclusion on the stability of its protecting films in Examples 7 and 8, the electrolyte systems containing TEP shows poor retention as soon as TEP weight percentage is 5%.

The discharge capacity of the first cycle and the ratio of the capacity of the 50$^{th}$ cycle to that of the first cycle are listed in Table 3 for the different POFs.

The effect of high weight percentages of phosphates on capacity retention is listed in Table 4 for the electrolyte systems containing both fluorinated and non-fluorinated control phosphates co-solvents.

Table 4

| Electrolyte Systems | Discharge Capacity of 1$^{st}$ cycle (mAh/cm$^2$) | Discharge Capacity of 50$^{th}$ Cycle as % of 1$^{st}$ Cycle |
| --- | --- | --- |
| 1 M LiPF$_6$/EC-EMC (1:1) | 1.1 | 85 |
| 1 M LiPF$_6$/EC-EMC/POF-I (1:1:1) | 1.02 | 100 |
| 1 M LiPF$_6$/EC-EMC/POF-II (1:1:1) | 1.05 | 100 |
| 1 M LiPF$_6$/EC-EMC/POF-III (1:1:1) | 1.00 | 76 |
| 1 M LiPF$_6$/EC-EMC/TEP (1:1:1) | 0.85 | 80 |
| 1 M LiPF$_6$/EC-EMC/TMP (1:1:1) | 0.2 | 10 |

The results shown in Table 4 indicates that high POF content improves retention but results in lower capacity for both POF-I and II, by as much as 1–3%. As shown in the Comparative Example 9, the discharge capacity and the capacity retention were adversely affected when TEP or TMP was added to the electrolyte. In this example, it is shown that the performance of the full cells was further deteriorated by increased amount of TMP or TEP.

EXAMPLE 11

Effect of POFs on Rate Capability of the Cell

This example shows the effect of POFs on cell rate capability. Cells using both control electrolyte systems as well as electrolyte systems containing phosphates POFs of this invention were cycled at different draining rates between C/10 to 3C, and the drop in capacity was taken as the rate response of the cell.

Figure 8:
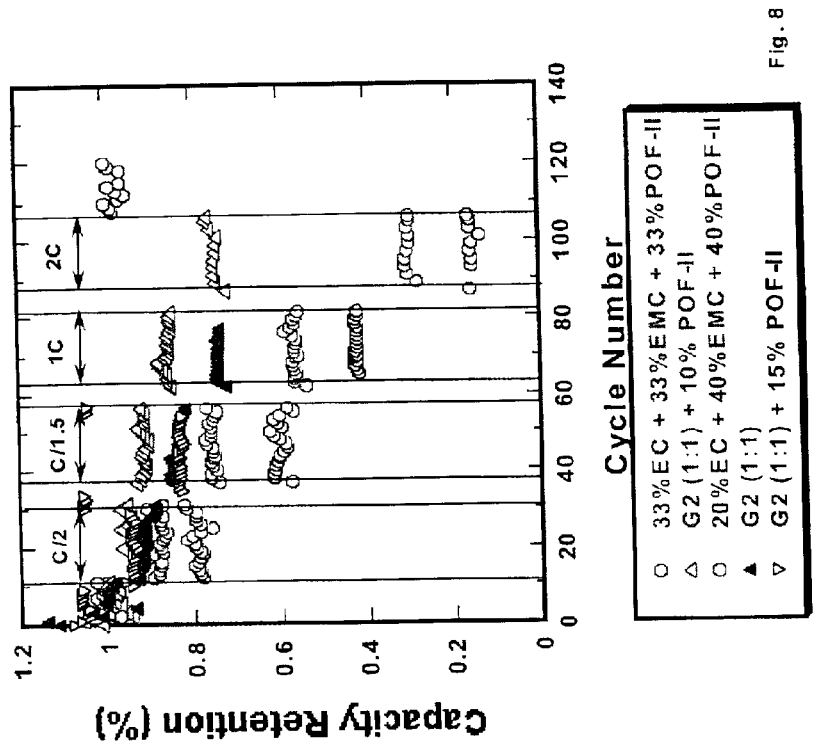
FIG. 8 is a graph showing the effect of POFs on the rate capability of lithium ion cells.

FIG. 8 shows the cell capacity changing with different drain rates. Clearly when POF-II weight percentage is at least 5%, the cell rate capability is improved as compared with the cell containing no POF.

Figures 9, 10:
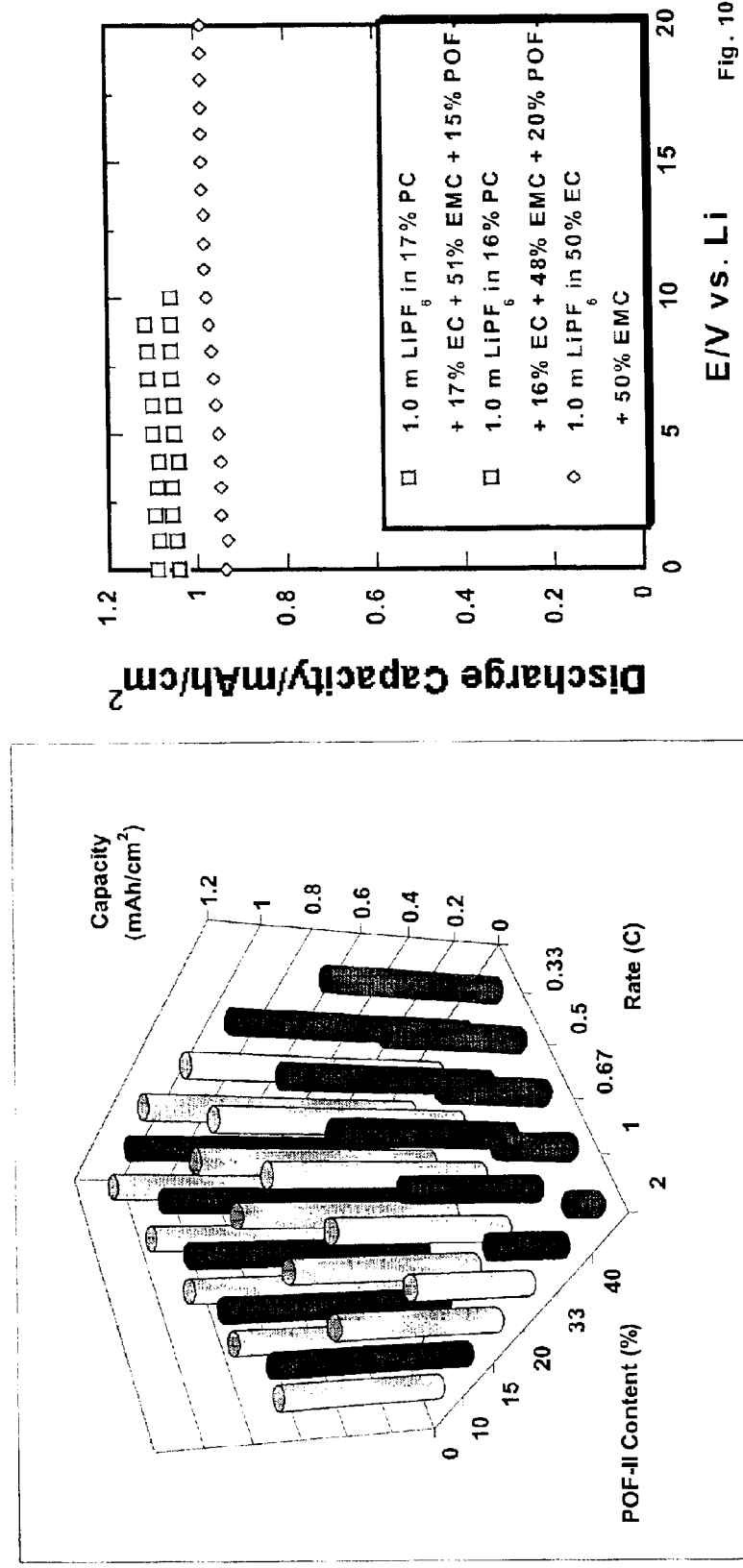
FIG. 9 is a three-dimensional graph showing dependence of lithium ion cell rate capability on POF-II content.
FIG. 10 is a plot of the effect of POFs on the discharge capacity of the lithium ion cells using ternary electrolyte systems PC/EC/EMC with 1.0 m LiPF$_6$.

FIG. 9 more clearly shows the dependence of cell rate capability on POF-II content. In this 3-D mapping, it is apparent that the optimum POF-II weight percentage to be used in the cell is at least 10%, where the rate capability, capacity and capacity retention are all superior to the cell containing no fluorinated phosphates POFs of this invention.

EXAMPLE 12

Effect of POFs in Ternary Electrolyte Systems Containing PC-EC-EMC

To further demonstrate the versatility of the fluorinated co-solvents of this invention in different non-aqueous carbonate electrolyte systems, this example shows the effectiveness of POFs in a ternary electrolyte system comprising propylene carbonate, ethylene carbonate and ethylmethyl carbonate.

FIG. 10 shows the discharge capacity of cell using electrolyte systems containing EC/PC/EMC and the co-solvents of this invention, as compared with the control electrolyte system containing no phosphates. The presence of the fluorinated alkyl phosphates improves cell discharge capacity and capacity retention as in binary electrolyte systems shown in Examples 9–12.

EXAMPLE 13

Flammability Tests

A flammability test was conducted to demonstrate the non-flammable nature of the electrolytes constructed in accordance with the present invention, wherein all percentages are by weight. The test was improved by minimizing the exposure of sample to air and also eliminating the wetting ability factor. Thus, an oval-instead of linear-shaped wick was used, and self-extinguishing time (SET) instead of burning distance was recorded for each pre-weighed sample. Such an oval-wick (e.g. a cotton swab) of approximately 1.0 cm in length and about 0.5 cm in diameter at the widest part in center can absorb 0.05–0.10 g electrolyte, and a good linear relationship was found between the extinguishing time and sample weight. To define a new quantity to describe the electrolyte flammability, the extinguishing time was normalized against sample weight. Compared with the above "burning rate" measurement, the present inventors found that this quantification makes better distinction for the electrolytes whose flammability has been greatly reduced to that of nearly non-flammable, i.e., the new method is more suitable for samples of low flammability, while the burning rate measurement is more appropriate for flammable samples.

Based on the new quantification, the electrolytes tested were classified into 3 categories: (1) non-flammable (SET<6, resulting in flame extinction within 0.5 s and more accurate time-reading is insignificant); (2) flammable (SET>20, wherein the flame lasted longer than 2 s and the linear carbonates were completely combusted); and (3) retarded (the cases lying between flammable and non-flammable).

Figure 11:
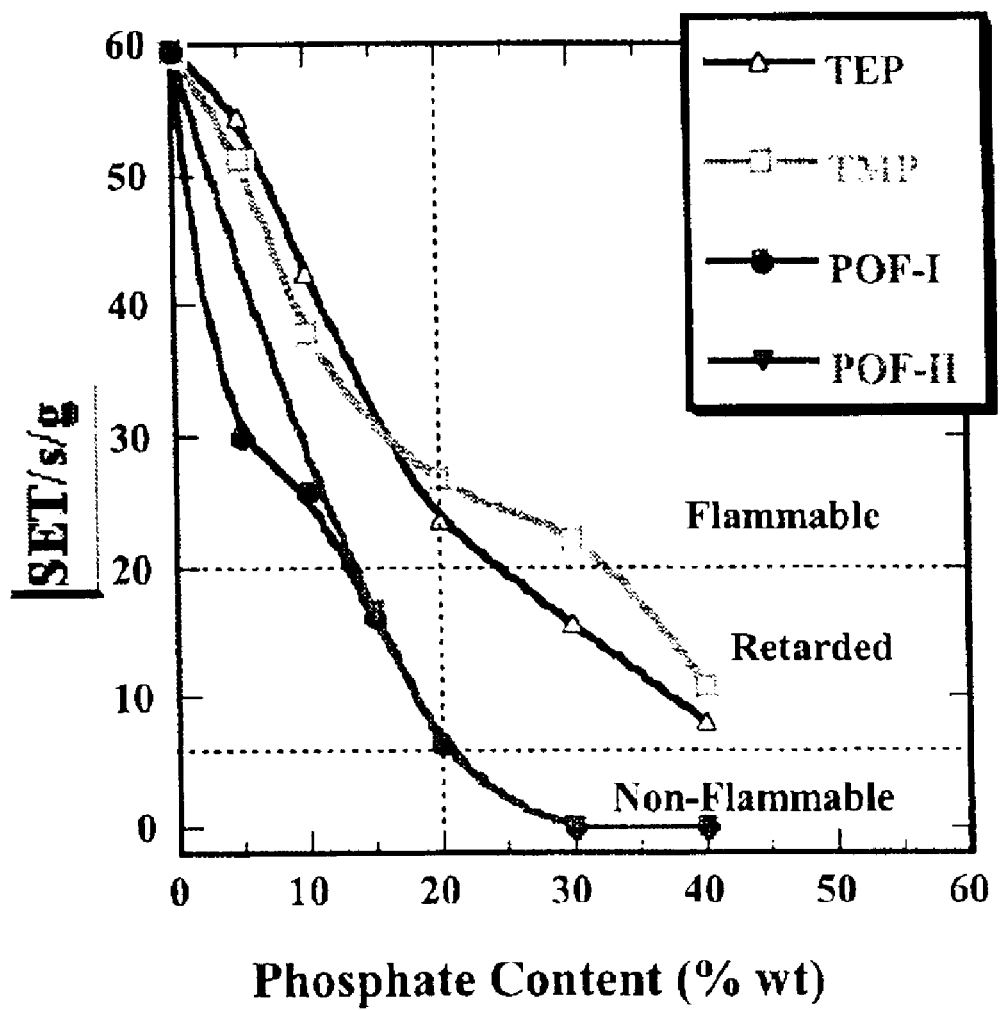
FIG. 11 is a graph showing normalized SET obtained versus weight percentage of phosphorous flame-retardants.

FIG. 11 shows the normalized SET thus obtained versus the weight percentage of the flame-retardants based on phosphorus (V). For each composition, 7 to 10 tests were completed and the average volume was plotted. All solvents were tested up to 40%. As FIG. 11 shows, the flammability of EC/EMC-based electrolytes is reduced drastically as the content of flame-retardants increases from 5%; however, even with 40% TMP or TEP the electrolytes are still not totally non-flammable. The efficiency of TMP and TEP in suppressing flammability is essentially the same considering the experimental error, and HMPN.

Self-extinguishing time normalized against liquid mass (SET) was used to quantify the flammability of the electrolytes. It was obtained by igniting pre-weighed electrolyte solutions either soaked in a porous wick or contained in a stainless steel can, followed by recording the time it took for the flame to extinguish. There is good consistence between these two means to immobilize the electrolyte solutions. For electrolyte samples nearly non-flammable the wick material (glass wool or cotton fiber) makes little difference in the result, however, for samples that are very flammable (e.g., control electrolyte), an inert wick such as glass wool is preferred. FIG. 11 shows that at higher than 20% of alkyl phosphate of the present invention, the electrolytes are non-flammable. However, in order to ensure complete non-flammability, a weight percentage of greater than about 27% is preferred. The additional alkyl phosphate is preferred to a percentage of greater than 20%, because, as shown in FIG. 11, the curve representing the flammability of the electrolyte solution continues to drop until an alkyl phosphate according to the invention percentage of about 27% is reached. At a concentration of about 27%, alkyl phosphate according to the present invention, the resulting electrolyte solution has a SET of about zero.

As comparison, various commercially available flame-retardants, TEP and TMP are shown. The flame-retarding ability of the invention (POF-I and POF-II) is obviously superior to that of TMP and TEP. At concentrations above 20% by weight the electrolytes are rendered non-flammable, while concentrations above about 27% are preferred to produce completely non-flammable electrolytes. Stability data also shows even levels of 50% POF-I, the electrolyte maintains its performance in lithium ion batteries.

On Graphite-Protection in Presence of Propylene Carbonate (PC)

Figure 12:
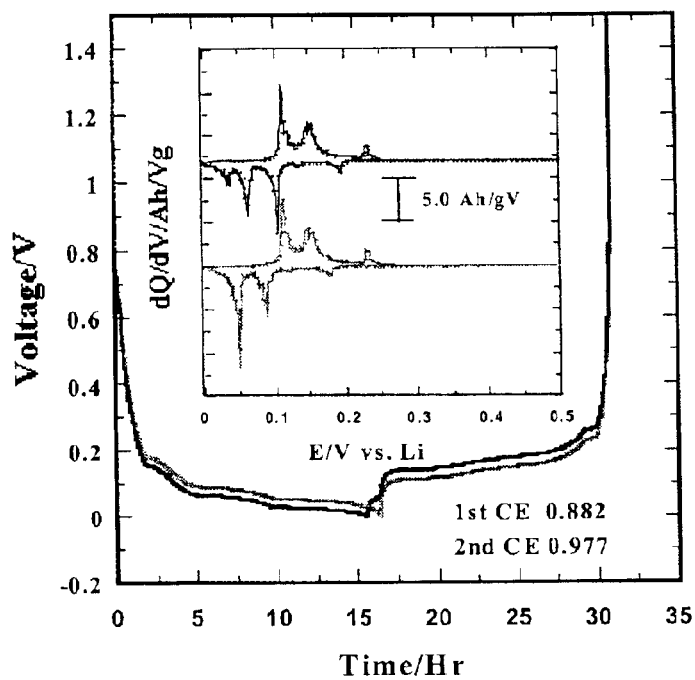
FIG. 12 is a graph showing the protection of PC by POF in the presence of a graphite anode.
Figure 13:
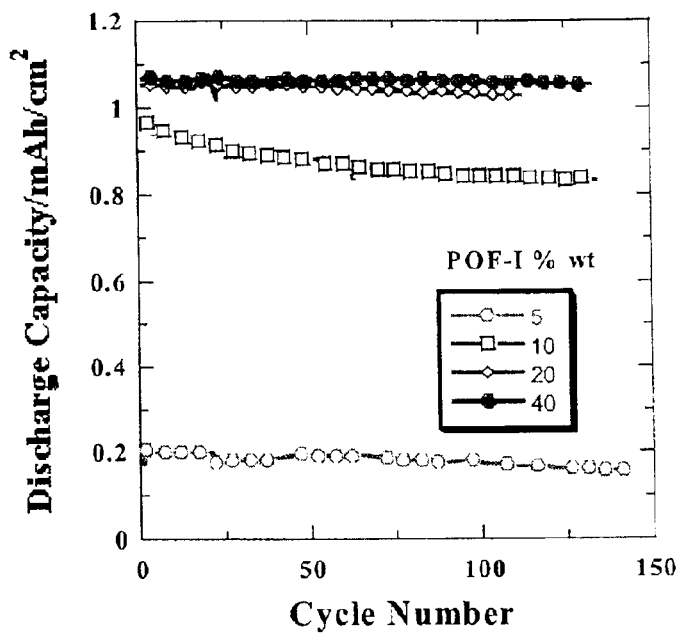
FIG. 13 is a graph showing the resulting discharge capacity as a function of cycle number for PC-containing electrolyte in the presence of a graphite anode.

Another achievement of this invention is that high content of POF-I (>20%) not only renders non-flammability to the electrolyte, but also protects the graphite structure in presence of PC-rich electrolyte, thus making it possible to replace EC with PC. Again, an even higher POF concentration (e.g. greater than about 27%) increases the non-flammability and graphite protection provided by the electrolyte formulation. FIGS. 12 and 13 show the effect of POF-contents on stability of graphite structure in PC-containing electrolytes. From the description above, and the conventional art, it is known that graphite electrodes cannot be practically used with electrolytes containing a significant portion of PC, as the graphite cannot be cycled. However, as indicated in FIG. 12, the addition of about 20% POF-I, permits the cycling of a graphite electrode.

Finally, FIG. 13 shows how differing percentages of POF-I protect the graphite electrode. Specifically, at 5%, although the discharge capacity is substantially uniform, the capacity level is not high enough to be practical. Although once 10% POF-I is used, the capacity becomes much higher, the capacity level shows a marked decrease as the cycle numbers increase; this trend will continue as the number of cycles continues. As the POF % breaks the 20% barrier (i.e. 20% and 40%), a high and relatively constant discharge capacity can be seen. This indicates that the addition of greater than 20% POF-I, preferably greater than about 27%, the graphite is completely cycled such that additional cycles do not exhibit a decrease in capacity.

Although described with reference to preferred embodiments, it should readily understood that various changes and/or modifications could be made to the invention without departing from the spirit thereof. In any event, the invention is only intended to be limited by the scope of the following claims.

We claim:

1. A non-aqueous electrolyte solution comprising:
   at least one lithium salt; and
   a solvent comprising,
      at least one cyclic carbonate;
      at least one linear carbonate; and
      one or more alkyl phosphates of the following general formula [1]

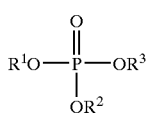

(1)

wherein $R^1$, $R^2$ and $R^3$, independently, are selected from the group consisting of straight and branched alkyl groups;
   wherein at least one of said alkyl groups is fluorinated, said flourine atoms at least β-substituted from the phosphorous of said phosphate;
   wherein said alkyl phosphate has an F/H ratio of at least 0.25;
   wherein said alkyl phosphate is greater than 20% by weight of said solvent and;
   wherein said solution is non-flammable.

2. The non-aqueous electrolyte solution of claim 1, wherein said alkyl phosphate is greater than 27% by weight of said solvent.

3. The non-aqueous electrolyte solution of claim 1, wherein said alkyl phosphate is at least 30% by volume of said solvent.

4. The non-aqueous electrolyte solution of claim 1, wherein said alkyl phosphate is at least 40% by volume of said solvent.

5. The non-aqueous electrolyte solution of claim 1, wherein said alkyl phosphate is at least 50% by volume of said solvent.

6. The non-aqueous electrolyte solution of claim 1, wherein least one of said alkyl groups contains 1–5 carbon atoms.

7. The non-aqueous electrolyte solution of claim 1, wherein said alkyl phosphate has an F/H ratio of at least 0.75.

8. The non-aqueous electrolyte solution of claim 1, wherein said alkyl phosphate is selected from the group consisting of tris(trifluoroethyl)phosphate (POF-I), bis(trifluoroethyl)methyl phosphate (POF-II), diethyltrifluoroethyl phosphate (POF-III), and tris(1,1,1,3,3,3-hexafluoro-2-propyl)phosphate (POF-IV).

9. The non-aqueous electrolyte solution of claim 1, wherein said lithium salt is selected from the group consisting of $LiPF_6$, $LiBF_4$, $LiAsF_6$, $LiClO_4$, $LiCF_3SO_3$, $LiN(CF_3SO_2)_2$, and $LiAlCl_4$.

10. The non-aqueous electrolyte solution of claim 9, wherein said lithium salt is $LiPF_6$.

11. The non-aqueous electrolyte solution of claim 1, wherein said lithium salt has a concentration of from 0.1–3 mol/L.

12. The non-aqueous electrolyte solution of claim 11, wherein said lithium salt has a concentration from 0.5–2 mol/L.

13. The non-aqueous electrolyte solution of claim 1, wherein said at least one cyclic carbonate is selected from the group consisting of propylene carbonate, ethylene carbonate, butylene carbonate and vinylene carbonate.

14. The non-aqueous electrolyte solution of claim 1, wherein said cyclic carbonate is 10–90% wt of said solvent.

15. The non-aqueous electrolyte solution of claim 1, wherein said linear carbonate is selected from the group consisting of dimethyl carbonate, diethyl carbonate, ethyl methyl carbonate, methyl propyl carbonate, methyl isopropyl carbonate, methyl butyl carbonate and ethyl butyl carbonate.

16. The non-aqueous electrolyte solution of claim 1, wherein said linear carbonate is 10–60% wt of said solvent.

17. A non-aqueous electrolyte cell comprising:
   the non-aqueous electrolyte solution of claim 1;
   a positive electrode and a negative electrode, in said non-aqueous electrolyte solution; and
   a separator between said positive electrode and said negative electrode.

18. The non-aqueous electrolyte cell of claim 17, wherein said negative electrode is selected from the group consisting of lithium metal, lithium alloys and carbonaceous materials capable of being intercalated and de-intercalated with lithium ions.

19. The non-aqueous electrolyte cell of claim 18, wherein said positive electrode is selected from the group consisting of transition metal oxides, transition metal sulfides, conducting polymers and compounds capable of being reversibly polymerized and de-polymerized by electrolysis.

20. The non-aqueous cell of claim 17, wherein said cell is a secondary cell.

21. The non-aqueous electrolyte solution of claim 1, wherein said electrolyte solution has an SET of 6 s/g at most.

22. The non-aqueous electrolyte solution of claim 1, wherein said electrolyte solution has an SET of about zero.

23. A non-aqueous electrolyte cell comprising:
   the non-aqueous electrolyte solution of claim 1;
   a positive electrode and a negative electrode, in said non-aqueous electrolyte solution; and
   a separator between said positive electrode and said negative electrode.

24. A non-aqueous electrolyte cell comprising:
   a positive electrode and a negative electrode, in said non-aqueous electrolyte solution; and
   a separator between said positive electrode and said negative electrode; and
   a non-aqueous electrolyte solution comprising:
      at least one lithium salt; and
      a solvent comprising,
         at least one cyclic carbonate;
         at least one linear carbonate; and
         one or more alkyl phosphates of the following general formula [1]

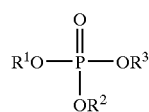

(1)

wherein $R^1$, $R^2$, $R^3$, independently, are selected from the group consisting of straight and branched alkyl groups having 1–5 carbon atoms, and at least one of said alkyl groups is fluorinated, with the locations of said fluorination being at least β-positioned away from the phosphorous of said phosphate, such that said alkyl phosphate has F/H ratio of at least 0.25, and said electrolyte solution is non-flammable.

* * * * *